United States Patent
Jones et al.

(10) Patent No.: US 10,727,716 B2
(45) Date of Patent: Jul. 28, 2020

(54) MOTOR WITH INTEGRATED EXPLOSION PROOF CONNECTOR ENCLOSURE WITH HOUR GLASS SHAPED WIRE THROUGH HOLE

(71) Applicant: Applied Motion Products, Inc., Watsonville, CA (US)

(72) Inventors: Jason J. Jones, Gower, MO (US); Kevin A. Kesler, Santa Cruz, CA (US)

(73) Assignee: Applied Motion Products, Inc., Watsonville, CA (US)

( * ) Notice: Subject to any disclaimer, the term of this patent is extended or adjusted under 35 U.S.C. 154(b) by 0 days.

(21) Appl. No.: 16/415,388

(22) Filed: May 17, 2019

(65) Prior Publication Data

US 2019/0273415 A1 Sep. 5, 2019

Related U.S. Application Data

(63) Continuation of application No. 15/442,623, filed on Feb. 25, 2017, now Pat. No. 10,312,770.

(51) Int. Cl.
*H02K 5/10* (2006.01)
*H02K 5/22* (2006.01)
*H02K 5/173* (2006.01)

(52) U.S. Cl.
CPC ............. *H02K 5/225* (2013.01); *H02K 5/10* (2013.01); *H02K 5/1732* (2013.01); *H02K 2213/03* (2013.01)

(58) Field of Classification Search
CPC .. H02K 5/15; H02K 5/10; H02K 5/12; H02K 5/124; H02K 5/1285; H02K 5/132; H02K 5/136; H02K 7/08; H02K 7/083; H02K 7/085; H02K 2213/03
USPC ........................................................ 220/237
See application file for complete search history.

(56) References Cited

U.S. PATENT DOCUMENTS

| | | | | |
|---|---|---|---|---|
| 1,618,877 A | * | 2/1927 | Henry ....................... | G10K 9/10 384/251 |
| 2,080,678 A | * | 5/1937 | Van Horn .............. | H02K 5/132 310/216.108 |
| 2,218,003 A | * | 10/1940 | Hawley, Jr. ............ | H02K 5/132 310/87 |
| 2,311,805 A | * | 2/1943 | Yost ..................... | H01B 17/306 310/87 |

(Continued)

FOREIGN PATENT DOCUMENTS

EP 0087960 * 2/1983 ............. H02K 5/136

*Primary Examiner* — Maged M Almawri
(74) *Attorney, Agent, or Firm* — Minisandram Law Firm; Raghunath S. Minisandram

(57) ABSTRACT

A motor is disclosed. The motor includes a first end bell, a second end bell and a stator with a stator coil disposed between the first end bell and the second end bell. A rotor with a rotor shaft that extends through the first end bell is disposed relative to the stator and rotates relative to the stator. The second end bell includes a first wall and a chamber, the first wall adjacent to the stator. The first wall includes a wire through hole to permit a plurality of conductors of the stator to pass through the first wall and into the chamber. A connector block with plurality of terminals is disposed within the chamber. Ends of each of the plurality of conductors are electrically connected to one of the plurality of terminals of the connector block. The wire through hole is filled with a sealant.

18 Claims, 4 Drawing Sheets

(56) References Cited

U.S. PATENT DOCUMENTS

| | | | | |
|---|---|---|---|---|
| 2,600,079 A * | 6/1952 | McCarl | F16C 33/18 | 384/125 |
| 2,740,059 A * | 3/1956 | Conery | H02K 5/132 | 310/87 |
| 2,845,551 A * | 7/1958 | Potter | H02K 5/132 | 310/87 |
| 3,308,316 A * | 3/1967 | Pfahl | H01B 17/306 | 310/87 |
| 3,335,323 A * | 8/1967 | Molin | H02K 9/24 | 361/23 |
| 3,638,055 A * | 1/1972 | Zimmermann | H02K 5/128 | 310/43 |
| 4,015,633 A * | 4/1977 | Mandell | F16J 15/52 | 138/89 |
| 4,260,918 A * | 4/1981 | Engle | H02K 5/132 | 310/68 B |
| 4,626,721 A * | 12/1986 | Ouchi | F04D 29/126 | 174/151 |
| 4,961,018 A * | 10/1990 | Akhter | F04D 15/0218 | 310/71 |
| 5,504,382 A * | 4/1996 | Douglass | H02K 1/278 | 310/114 |
| 5,889,343 A * | 3/1999 | Bryant | H02K 5/225 | 174/653 |
| 5,923,108 A * | 7/1999 | Matake | H02K 5/128 | 310/71 |
| 6,118,620 A * | 9/2000 | Grantz | F16C 17/105 | 360/99.08 |
| 7,786,635 B2 * | 8/2010 | Gasser | H02K 5/10 | 310/43 |
| 7,804,212 B2 * | 9/2010 | Moody | H02K 5/225 | 310/88 |
| 8,482,173 B2 * | 7/2013 | Wright | F04D 13/06 | 310/400 |
| 9,831,739 B2 * | 11/2017 | Tejano | H02K 5/136 | |
| 9,929,608 B2 * | 3/2018 | Friedman | H02K 5/161 | |
| 9,973,053 B2 * | 5/2018 | Nakazumi | H02K 5/10 | |
| 10,047,752 B2 * | 8/2018 | Hayakawa | F02M 37/10 | |
| 2005/0074343 A1 * | 4/2005 | Naito | F04D 5/002 | 417/423.3 |
| 2009/0152962 A1 * | 6/2009 | Gasser | H02K 5/10 | 310/43 |
| 2009/0155101 A1 * | 6/2009 | Fukasaku | F04C 18/0215 | 417/410.1 |
| 2010/0176673 A1 * | 7/2010 | Wright | F04D 13/06 | 310/88 |
| 2010/0237721 A1 * | 9/2010 | Ishizue | H02K 5/08 | 310/43 |
| 2011/0095163 A1 * | 4/2011 | Phan | H02K 5/15 | 248/562 |
| 2011/0097219 A1 * | 4/2011 | Hsu | F04B 53/16 | 417/321 |
| 2011/0133582 A1 * | 6/2011 | Bingler | F04B 17/03 | 310/71 |
| 2011/0181221 A1 * | 7/2011 | Asahi | G01D 5/145 | 318/400.39 |
| 2013/0234541 A1 * | 9/2013 | Oleson | H02K 5/12 | 310/54 |
| 2013/0320792 A1 * | 12/2013 | Fukasaku | H02K 5/22 | 310/89 |
| 2013/0336817 A1 * | 12/2013 | Honda | H02K 3/50 | 417/410.1 |
| 2014/0050605 A1 * | 2/2014 | Inada | F04C 29/0085 | 417/420 |
| 2014/0150592 A1 * | 6/2014 | Kremerman | H02K 5/128 | 74/490.03 |
| 2014/0271271 A1 * | 9/2014 | Intelisano | F04B 17/03 | 417/410.1 |
| 2014/0339939 A1 * | 11/2014 | Illingworth | H02K 5/10 | 310/88 |
| 2014/0375157 A1 * | 12/2014 | Taguchi | F04B 35/04 | 310/71 |
| 2015/0256054 A1 * | 9/2015 | Northwall | H02K 5/136 | 310/68 C |
| 2016/0128213 A1 * | 5/2016 | Wohrstein | H02K 5/136 | 73/431 |
| 2016/0365770 A1 * | 12/2016 | Nelson | H01M 8/04201 | |
| 2016/0372987 A1 * | 12/2016 | Tejano | H02K 5/136 | |
| 2017/0141634 A1 * | 5/2017 | Honda | H02K 15/095 | |
| 2017/0194830 A1 * | 7/2017 | Poretti | H02K 11/25 | |
| 2017/0229943 A1 * | 8/2017 | Hattori | F04B 35/04 | |
| 2017/0241246 A1 * | 8/2017 | Hamsberger | E21B 41/00 | |
| 2017/0244294 A1 * | 8/2017 | Holzmueller | E21B 43/128 | |
| 2017/0324296 A1 * | 11/2017 | Fritts | H02K 5/10 | |

* cited by examiner

MOTOR WITH INTEGRATED EXPLOSION PROOF CONNECTOR ENCLOSURE WITH HOUR GLASS SHAPED WIRE THROUGH HOLE

CROSS-REFERENCE TO RELATED APPLICATIONS

This application is a continuation application of U.S. patent application with Ser. No. 15/442,623 filed on Feb. 25, 2017, and entitled "MOTOR WITH INTEGRATED CONNECTOR ENCLOSURE". application Ser. No. 15/442,623 filed on Feb. 25, 2017 is incorporated herein by reference in its entirety.

TECHNICAL FIELD

The present invention relates generally to a motor and, more particularly, to a motor with integrated connector enclosure.

DESCRIPTION OF RELATED ART

A motor, for example, a stepper motor is an electromechanical device that selectively rotates a shaft in steps, based on an input signal. Stepper motors are used in various industrial applications. For example, in some examples, the shaft of the stepper motor may be used as a prime mover to selectively move another device. In some examples, the device may be a valve controlling a flow of a fluid. By selectively moving the shaft of the stepper motor, a position of the valve may be advantageously changed, based on the needs of the application.

In some applications, the stepper motor may be used in industrial applications where the environment may demand certain characteristics or attributes. As an example, in some environment, the stepper motor may have to withstand corrosive materials in the environment. In some examples, any potential fire or spark generated inside the stepper motor may have to be contained within a limited confines of the stepper motor. In some examples, containment of a fire or a spark may have to be maintained within the confines of other components that are coupled to the stepper motor.

It may be desirable to design a stepper motor that may meet one or more environmental constrains or attributes in which the stepper motor is used in an industrial application. It is with these needs in mind, this disclosure arises.

SUMMARY OF THE INVENTION

In one embodiment, a motor is disclosed. The motor includes a first end bell, a second end bell and a stator with a stator coil disposed between the first end bell and the second end bell. A rotor with a rotor shaft is disposed relative to the stator, the rotor configured to rotate relative to the stator and the rotor shaft extending through the first end bell. The second end bell includes a first wall and a chamber, the first wall adjacent to the stator. The first wall includes a wire through hole to permit a plurality of conductors of the stator to pass through the first wall and into the chamber. A connector block with a plurality of terminals are disposed within the chamber. Ends of each of the plurality of conductors are electrically connected to one of the plurality of terminals of the connector block. The wire through hole in the first wall of the second end bell is filled with a sealant.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

Figure 1:
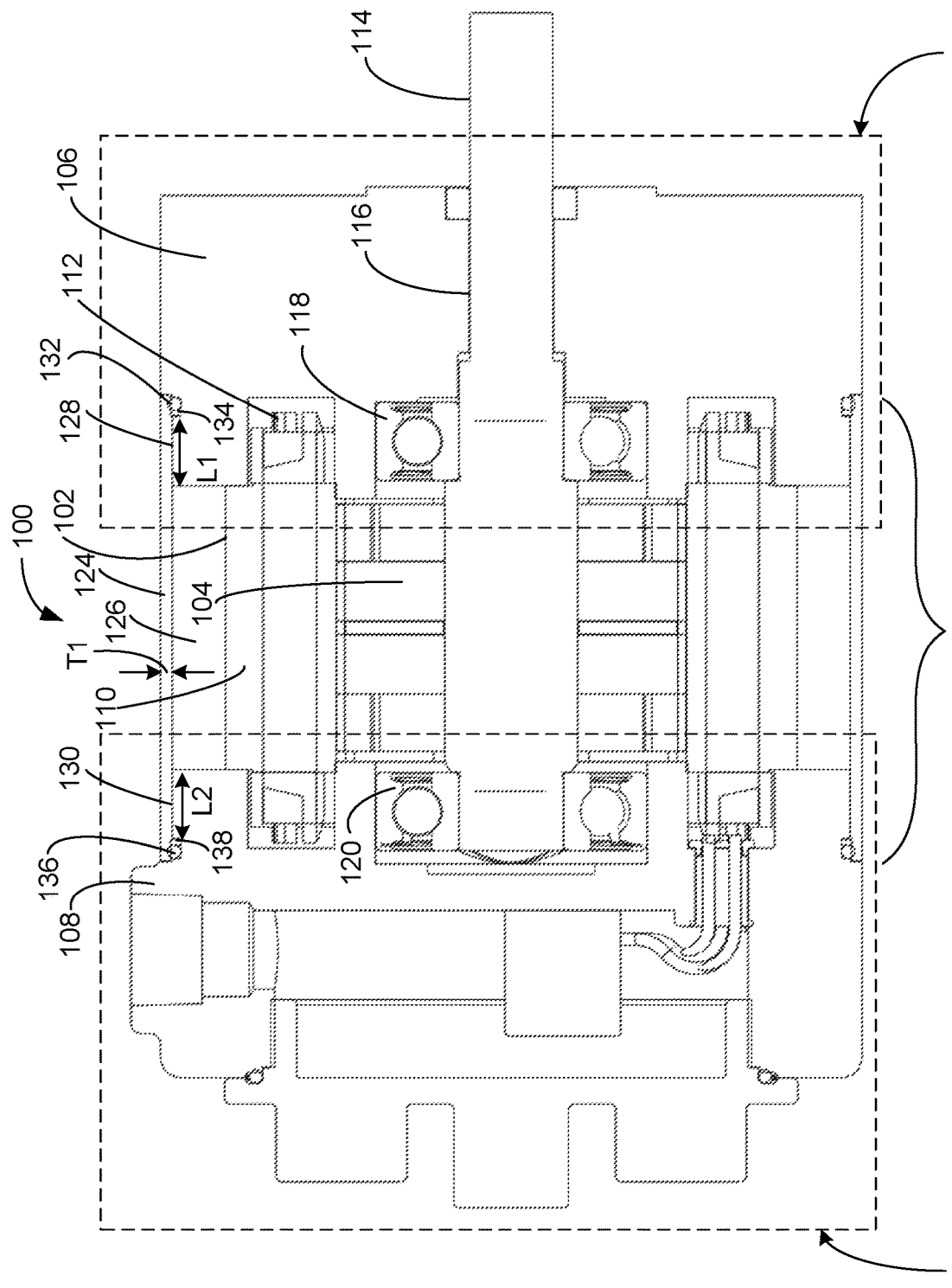
FIG. 1 shows an example motor of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a motor with an integrated connector enclosure. Referring now to the drawings, where similar reference characters denote corresponding features consistently throughout the figures, various examples of this disclosure is described.

FIG. 1 depicts an example motor 100 with an integrated connector enclosure. Motor 100 includes a stator 102, a rotor 104, a first end bell 106 and a second end bell 108. The stator 102 includes stator laminations 110 and stator coil 112 wound on the stator laminations 110. Rotor 104 includes a rotor shaft 114 extending through a shaft through hole 116 in the first end bell 106. A first bearing 118 is disposed in the first end bell 106 and a second bearing 120 is disposed in the second end bell 108. The rotor shaft 114 is coupled to inner race of the first bearing 118 and the second bearing 120 to permit rotation of the rotor 104 relative to the stator 102 when the stator coils 112 are selectively energized, as well known to one skilled in the art.

The stator 102 and rotor 104 are held together by the first end bell 106 and the second end bell 108. For example, a plurality of fasteners (not shown) may be driven from the first end bell 106 to the second end bell 108, through the stator 102 to hold the stator 102 and the rotor 104 between the first end bell 106 and the second end bell 108. In some examples, the stator 102 and portion of the rotor 104 between the first end bell 106 and the second end bell 108 may be generally referred to as a stator-rotor portion 122.

In one example, the motor 100 is designed to be used in environments where combustible gases may be present. In some examples, if there are any internal ignition within the motor, the motor is designed to prevent escape of flames and hot gases to the outside environment. Various design elements incorporated in one or more examples of the motor 100 will now be described.

In one example, a shell 124 is disposed between the first end bell 106 and the second end bell 108, so as to substantially surround the stator-rotor portion 122 of the motor 100. In one example, the shell 124 is made up of a metal or an alloy of a metal. In one example, the shell 124 is made of steel. In one example, a shell cavity 126 is defined between the outer surface of the stator 102 and the inner surface of the shell 124. The shell 124 extends over a portion of the first end bell 106, to form a first joint 128. The shell 124 also extends over a portion of the second end bell 108, to form a second joint 130.

A length L1 of the first joint 128 and a length L2 of the second joint 130 are so chosen so as to prevent flames or hot gases from exiting the motor 100. In one example, the length L1 and L2 are chosen based on free air volume within the motor and circumference of the joint. In one example, the length L1 and L2 are at least 9.5 mm. In one example, the length L1 and L2 is about 13.15 mm. In one example, a thickness of the shell 124 is chosen based on the material of the shell 124, free air volume within the motor 100, internal surface area of the shell 124. In one example, the shell 124 is made of steel, with a thickness T1 of preferably at least about 1.5 mm. In one example, the thickness T1 is chosen to be about 2.5 mm.

In one example, a first o-ring 132 is disposed in a recess 134 in the first end bell 106. A second o-ring 136 is disposed in another recess 138 in the second end bell 108. The dimensions of the first o-ring 132 and the second o-ring 136 are so chosen so as to provide a seal between the shell 124 and the first end bell 106 and the second end bell 108 respectively. In one example, the first o-ring 132 and the second o-ring 136 prevent entry of fluids into the stator-rotor portion 122 of the motor 100.

Figure 1A:
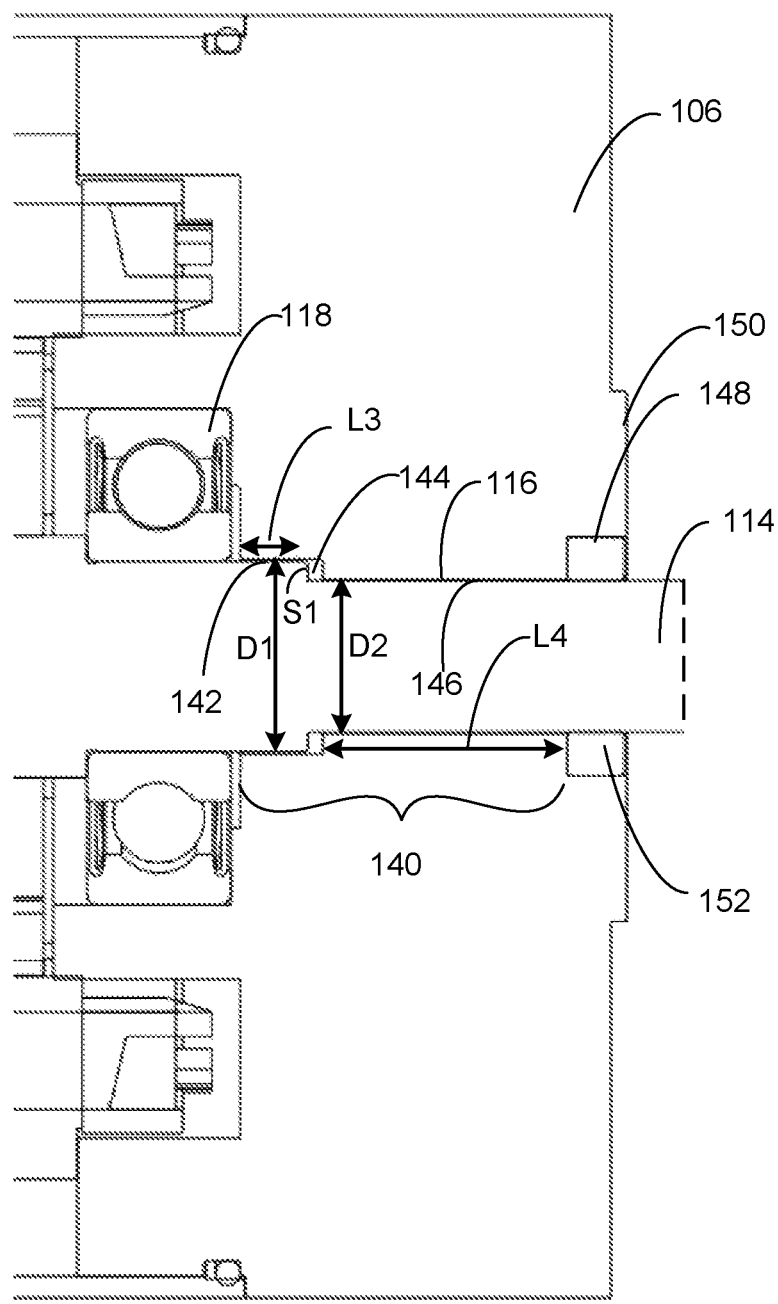
FIG. 1A shows a partial exploded view of FIG. 1, showing first end bell of the motor of FIG. 1, according to an example of this disclosure.

Now, referring to FIG. 1A, a partial exploded view of a portion of the motor 100 is shown. FIG. 1A highlights various features of the first end bell 106. A labyrinth joint 140 is formed in the first end bell 106, surrounding the rotor shaft 114. The labyrinth joint 140 includes a first portion 142, a second portion 144 and a third portion 146. The first portion 142 has a length of L3. The second portion 144 has a height (or step) of S1, defined by a difference between the diameter D1 and diameter D2 of the rotor shaft 114. The third portion 146 has a length of L4. The labyrinth joint 140 is so chosen to be at least sufficient to prevent escape of hot gases and flames due to an internal ignition within the motor. For example, an internal ignition may occur within the stator-rotor portion 122.

In some examples, length L3 is preferably at least about 3.2 mm. In one example, the length L3 is chosen to be about 7 mm. In some examples, the step S1 is so chosen to be at least sufficient to prevent escape of hot gases and flames due to an internal ignition within the motor. For example, an internal ignition may occur within the stator-rotor portion 122 of the motor 100. In some examples, the step S1 is about at least 1.6 mm.

In some examples, a length L4 of the shaft through hole 116 is so chosen to be at least sufficient to prevent escape of hot gases and flames due to an internal ignition within the motor. For example, an internal ignition may occur within the stator-rotor portion 122. In some examples, length L4 is preferably at least 25.4 mm. The length L4 may vary depending upon internal free air volume within the motor and circumference of the joint.

In some examples, a certain clearance is maintained between the shaft 114 and hole 116 along both the first portion 142 and the third portion 146. In one example, a diametrical clearance of about 0.5 mm is maintained along the first portion 142. In one example, a diametrical clearance of about 0.315 mm is maintained along the third portion 146. The diametrical clearance maintained may depend upon internal free air volume within the motor and circumference of the labyrinth joint 140.

At a distal end of the shaft through hole 116, a recess 148 is formed on an outer surface 150 of the first end bell 106, surrounding the rotor shaft 114. The depth and diameter of the recess 148 is so chosen so as to receive a seal ring 152 in the recess 148.

In general, the dimensions of the labyrinth joint 140, shaft through hole 116 and the recess 148 are so chosen to relieve internal pressure within the motor 100, for example, within the stator-rotor portion 122 of the motor 100. Further, the dimensions of the labyrinth joint 140, shaft through hole 116 and the recess 148 are so chosen to prevent flames or hot gases from escaping the motor 100, due to an internal ignition within the motor 100, for example, within the stator-rotor portion 122 of the motor 100.

Figure 1B:
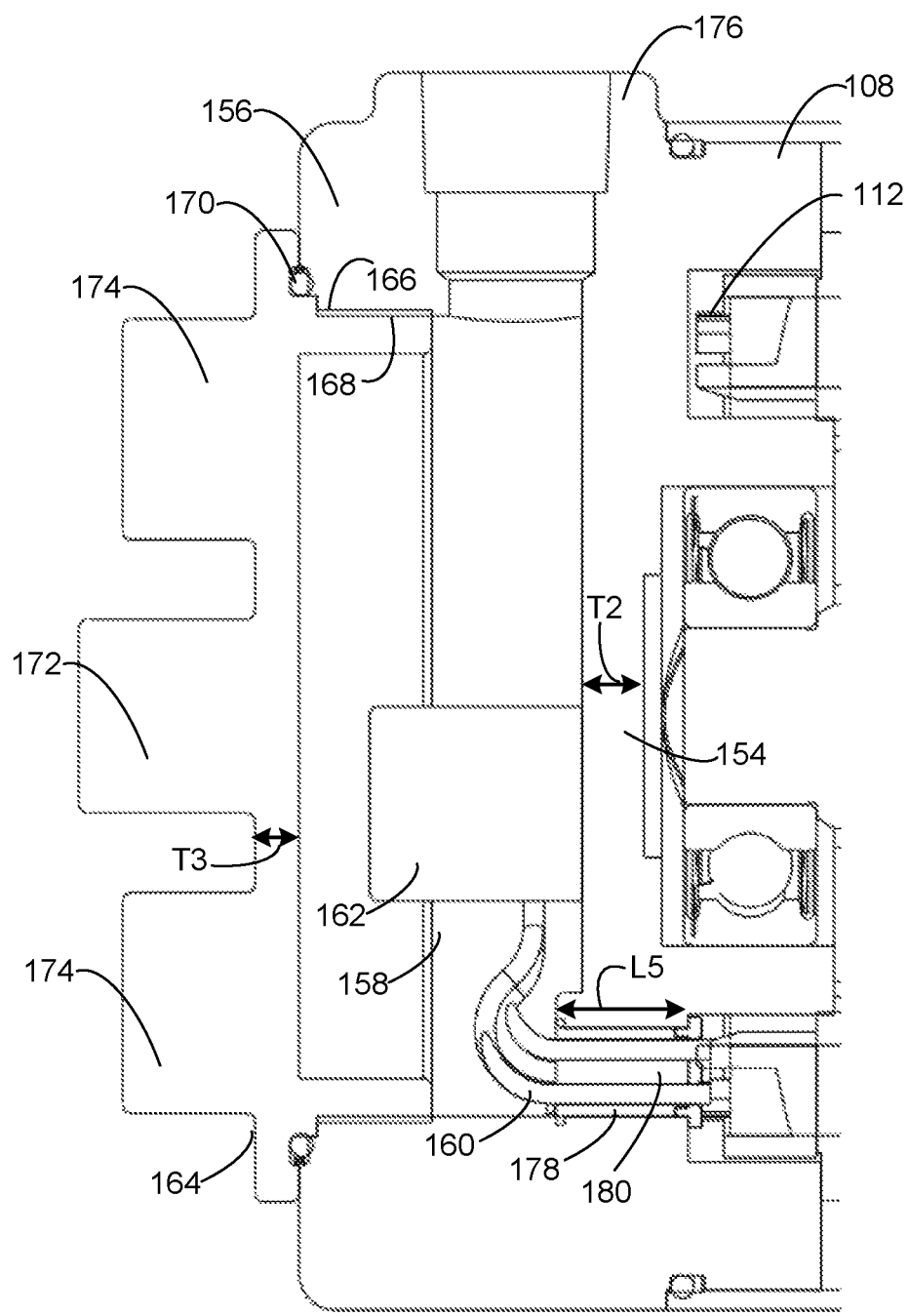
FIG. 1B shows a partial exploded view of FIG. 1, showing second end bell of the motor of FIG. 1, according to an example of this disclosure.

Now, referring to FIG. 1B, a partial exploded view of a portion of the motor 100 is shown. FIG. 1B highlights various features of the second end bell 108. The second end bell 108 includes a first wall 154, a side wall 156 and a chamber 158 defined by the first wall 154 and the side wall 156. A wire through hole 178 is provided in the first wall 154 of the second end bell 108. A plurality of conductors 160 coupled to the stator coils 112 exit into the chamber 158 through the wire through hole 178. In one example, a connector block 162 is disposed within the chamber 158. In one example, the connector block 162 may be coupled to the first wall 154 of the second end bell 108. In one example, the connector block 162 may be formed integral with the first wall 154 of the second end bell 108. Ends of the plurality of conductors 160 are connected to a plurality of terminal (not shown) of the connector block 162.

In one example, the wire through hole 178 is filled with a sealant 180. Sealant 180 is so chosen to prevent escape of hot gases and flames into the chamber 158 of the second end bell 108, due to an internal ignition in the motor 100, for example, in the stator-rotor portion 122 of the motor. A length of the wire through hole 178 is so chosen to be of sufficient length and filled with the sealant 180 so as to prevent entry of gas vapors from the chamber 158 into the stator-rotor portion 122 of the motor. In one example, the sealant may be an explosion rated potting epoxy. One example sealant for use may be LOCKTITE® e-40exp potting epoxy available from Henkel Corporation. In one example, a length L5 of the wire through hole 178 is so chosen to be at least sufficient to prevent escape of hot gases and flames due to an internal ignition within the motor. For example, an internal ignition may occur within the stator-rotor portion 122. In some examples, length L5 is preferably at least 12.7 mm. In one example, the length L5 is chosen to be about 13.5 mm. In one example, the length L5 is chosen based upon a volume of the motor.

In one example, a mechanical feature may be formed into wall of the wire through hole 178 so as to retain the sealant 180 within the wire through hole 178. The mechanical feature may assist in retaining the sealant 180 in place, in case of an internal ignition in the stator-rotor portion 122 or the chamber 158. In one example, the mechanical feature may be groves formed on the wall of the wire through hole 178. In one example, the mechanical feature may be threads formed on the wall of the wire through hole 178. In one example, the wall of the wire through hole 178 may be tapered along the length of the wire through hole 178. In one example, the wire through hole 178 may be shaped like an hour glass, with a diameter of the wire through hole 178 about the middle of the length of the wire through hole 178 smaller than the diameter of the wire through hole 178 about the ends of the wire through hole 178.

In one example, a minimum thickness of T2 is preferable for the first wall 154 of the second end bell 108. Thickness T2 is so chosen so that it is at least sufficient to withstand an explosion within the motor 100. For example, an explosion within the stator-rotor portion 122 of the motor 100. Thickness T2 depends upon the type of material used to fabricate the second end bell 108. As an example, the thickness T2 is preferably at least 3.18 mm, for a second end bell 108 made of aluminum.

A chamber cover 164 is configured to enclose the chamber 158 of the second end bell 108. In one example, inner portion 166 of the side wall 156 of the second end bell 108 is threaded so as to mate with a corresponding thread on the outer portion 168 of the chamber cover 164. Thread type and depth may be determined to contain an internal explosion within chamber 158, should that occur. A cover seal ring 170 is disposed between the side wall 156 and the chamber cover 164 so as to seal the chamber 158. In one example, the seal ring 170 assists in keeping liquids from entering chamber 158 from outside the motor.

The chamber cover 164 in one example includes a stud 172 with a plurality of side walls configured to receive a tool to thread the chamber cover 164 into the threaded inner portion 166 of the side wall 156. In some examples, a plurality of tabs 174 may be disposed on the chamber cover 164 to permit rotation of the chamber cover 164, for example to either remove the chamber cover 164 from the second end bell 108 or install the chamber cover 164 into the second end bell 108. As one skilled in the art appreciates, by selectively removing the chamber cover 164, the connector block 162 may be selectively accessed within the chamber 158.

In one example, a minimum thickness of T3 is preferable for the chamber cover 164. Thickness T3 is so chosen so that it is at least sufficient to withstand an explosion within the chamber 158. Thickness T3 depends upon the type of material used to fabricate the chamber cover 164. As an example, the thickness T3 is preferably at least 3.18 mm, for a chamber cover 164 made of aluminum.

In one example, the side wall 156 further includes a conduit extension 176. The conduit extension 176 is configured to couple to a conduit pipe (not shown) to receive an external cable or wiring disposed within the conduit pipe into the chamber 158. The external cable or wiring may be advantageously coupled to the plurality of conductors 160 of the stator coil 112. In one example, the external cable or wiring may be coupled to the plurality of conductors 160 of the stator coil 112 using the connector block 162. For example by selectively removing the chamber cover 164, the connector block 162 may be selectively accessed to couple the external cable to the plurality of conductors 160 of the stator coil 112. In some examples, the external cable may be coupled to a motor controller (not shown) to selectively energize the motor 100. In some examples, the external cable or wiring may be selectively coupled to the plurality of conductors 160 without using the connector block. For example, a twist wire nut may be used to selectively couple the external cable or wiring to the plurality of conductors 160. In some examples, the plurality of conductors 160 may be selectively soldered to the external cable or wiring.

Figure 2:
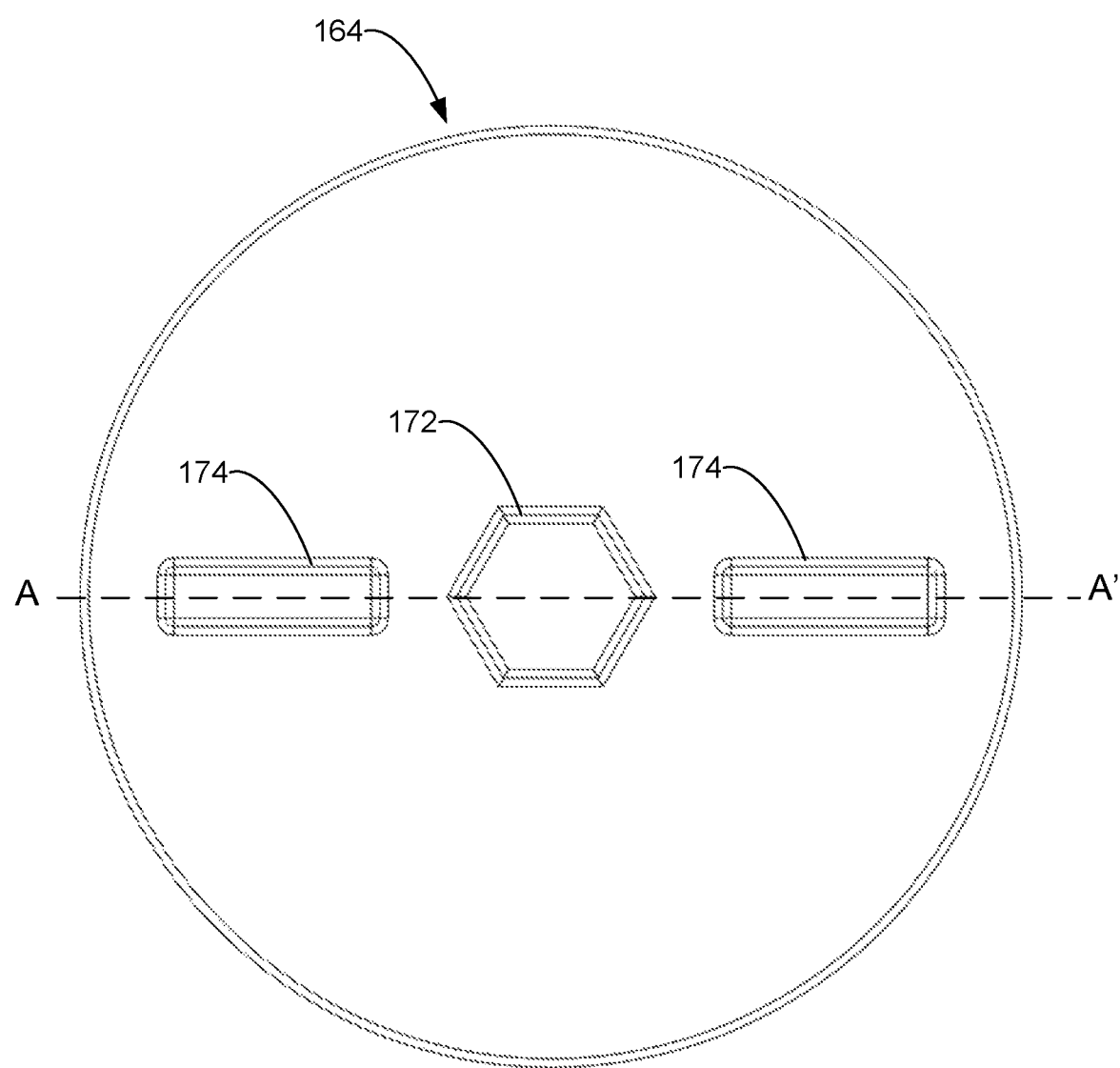
FIG. 2 shows an example cover plate, according to an example of this disclosure.

FIG. 2 shows a top view of the chamber cover 164. In this example, the chamber cover 164 is circular. The stud 172 is disposed about the center of the chamber cover 164 and has a hexagonal cross-section. Further, the tabs 174 are disposed along an axis A-A' passing through a center of the chamber cover 164, spaced apart from the stud 172 so as to permit insertion of a tool into or into the stud 172.

In some examples, it may be preferable to make various components of the motor 100 to be corrosion resistant. For example, the first end bell 106 and second end bell 108 may be made of material less susceptible to corrosion, for example, aluminum or stainless steel. In some examples, the first end bell 106 and second end bell 108 may be coated with a corrosion resistant coating or deposition. In some examples, the stator lamination 110 may be coated with a corrosion resistant coating or deposition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A motor, comprising:
   a first end bell;
   a second end bell;
   a stator with a stator coil disposed between the first end bell and the second end bell;
   a rotor with a rotor shaft, the rotor disposed relative to the stator between the first end bell and the second end bell, the rotor configured to rotate relative to the stator and the rotor shaft extending through the first end bell;
   the second end bell including a first wall and a chamber, the first wall adjacent the stator, wherein the first wall including a wire through hole to permit a plurality of conductors of the stator to pass through the first wall and into the chamber; and
   a connector block with a plurality of terminals disposed within the chamber, ends of each of the plurality of conductors of the stator electrically connected to one of the plurality of terminals of the connector block, wherein, the wire through hole in the first wall of the second end bell is filled with a sealant, and wherein walls of the wire through hole are tapered to form a hour glass shaped through hole, with a diameter of the wire through hole about the middle of the wire through hole smaller than a diameter of the wire through hole about the ends of the wire through hole.

2. The motor of claim 1, wherein, the stator and a portion of the rotor disposed between the first end bell and the second end bell defining a stator-rotor portion, and the sealant filled in the wire through hole in the first wall of the second end bell is configured to prevent escape of hot gases and flames from the stator-rotor portion due to an internal ignition in the stator-rotor portion of the motor into the chamber of the second end bell.

3. The motor of claim 2, wherein, the sealant filled in the wire through hole in the first wall of the second end bell is configured to prevent entry of gas vapors from the chamber into the stator-rotor portion of the motor.

4. The motor of claim 2, wherein a shell is disposed between the first end bell and the second end bell, the shell configured to surround the stator-rotor portion of the motor.

5. The motor of claim 2, wherein, a thickness of the second end bell is configured to withstand an explosion within the stator-rotor portion of the motor.

6. The motor of claim 1, wherein the motor further including a first bearing and a second bearing, the first bearing disposed within the first end bell and the second bearing disposed within the second end bell, the rotor shaft operatively coupled to the first bearing and the second bearing so as to permit the rotation of the rotor relative to the stator.

7. The motor of claim 6, wherein the rotor shaft extends through a shaft through hole in the first end bell, a labyrinth joint is disposed between the rotor shaft and the shaft through hole, wherein a length of the labyrinth joint is configured at least sufficient to prevent escape of hot gases and flames due to an internal ignition in the stator-rotor portion of the motor in a gap between the rotor shaft and walls of the shaft through hole.

8. The motor of claim 7, wherein a length of the shaft through hole is configured to prevent escape of hot gases and flames due to an internal ignition in the stator-rotor portion of the motor.

9. The motor of claim 7, wherein a recess is formed on an outer surface of the first end bell, the recess surrounding the rotor shaft configured to relieve internal pressure within the stator-rotor portion.

10. The motor of claim 9, wherein a seal ring is disposed in the recess.

11. The motor of claim 1, wherein, a chamber cover is disposed opposite the first wall of the second end bell to selectively enclose the chamber formed in the second end bell.

12. The motor of claim 11, wherein a thickness of the chamber cover is configured to withstand an explosion within the chamber of the second end bell.

13. The motor of claim 11, wherein the second end bell including a side wall, the first wall and the side wall defining the chamber, the chamber cover configured to mate with the side wall to selectively enclose the chamber.

14. The motor of claim 13, wherein a seal ring is disposed between the chamber cover and the side wall.

15. The motor of claim 13, wherein the side wall further including a conduit extension, the conduit extension configured to couple to a conduit pipe and receive an external cable disposed within the conduit pipe into the chamber so as to permit electrical coupling of the external cable to the plurality of conductors of the stator coil.

16. The motor of claim 11, wherein the chamber cover further including a threaded portion to mate with a threaded portion of the side wall of the second end bell.

17. The motor of claim 16, wherein the chamber cover further including a stud with a plurality of side walls configured to receive a tool to thread the chamber cover into the threaded portion of the side wall of the second end bell.

18. The motor of claim 17, wherein the chamber cover further including a plurality of tabs to permit rotation of the chamber cover.

* * * * *